US010711886B2

(12) United States Patent
Ichi et al.

(10) Patent No.: US 10,711,886 B2
(45) Date of Patent: Jul. 14, 2020

(54) VEHICLE EQUIPPED WITH TRANSMISSION

(71) Applicant: KAWASAKI JUKOGYO KABUSHIKI KAISHA, Kobe-shi, Hyogo (JP)

(72) Inventors: Satoaki Ichi, Akashi (JP); Jun Tominaga, Himeji (JP); Yoshimoto Matsuda, Kobe (JP)

(73) Assignee: KAWASAKI JUKOGYO KABUSHIKI KAISHA, Kobe-shi, Hyogo (JP)

( * ) Notice: Subject to any disclaimer, the term of this patent is extended or adjusted under 35 U.S.C. 154(b) by 91 days.

(21) Appl. No.: 16/227,346

(22) Filed: Dec. 20, 2018

(65) Prior Publication Data

US 2019/0301602 A1    Oct. 3, 2019

(30) Foreign Application Priority Data

Mar. 30, 2018 (JP) .................. 2018-066962

(51) Int. Cl.
*F16H 61/32* (2006.01)
*B60W 10/02* (2006.01)
(Continued)

(52) U.S. Cl.
CPC ............. *F16H 61/32* (2013.01); *B60W 10/02* (2013.01); *B60W 10/06* (2013.01); *B60W 10/11* (2013.01);
(Continued)

(58) Field of Classification Search
None
See application file for complete search history.

(56) References Cited

U.S. PATENT DOCUMENTS 7,069,801 B2 * 7/2006 Yone .................... B60K 26/021
                                                  74/335
8,327,732 B2 * 12/2012 Giefer .................... F16H 61/22
                                                  74/473.23
(Continued)

FOREIGN PATENT DOCUMENTS

EP        2023019 A1 *  2/2009  ............. F16H 61/32
EP        2023019 A1    2/2009
JP     2012237347 A    12/2012

*Primary Examiner* — Dirk Wright
(74) *Attorney, Agent, or Firm* — Alleman Hall Creasman & Tuttle LLP

(57) ABSTRACT

A vehicle includes a transmission; a shift operation member configured to be operated by a rider; a manual shift driving force transmission mechanism which transmits an operation force generated by the rider's operation of the shift operation member, to the transmission, as a shift driving force; a transmission actuator; an automatic shift driving force transmission mechanism which transmits a driving force generated by the transmission actuator to the manual shift driving force transmission mechanism, as the shift driving force, and the automatic shift driving force transmission mechanism includes a one-direction transmission section which prevents transmission of an operation of the manual shift driving force transmission mechanism to the transmission actuator, the operation being caused by the rider's operation of the shift operation member, the one-direction transmission section being configured to transmit the driving force generated by the transmission actuator to the manual shift driving force transmission mechanism.

10 Claims, 10 Drawing Sheets

(51) Int. Cl.
  *B60W 10/06* (2006.01)
  *B60W 10/11* (2012.01)
  *B60W 30/18* (2012.01)
  *B60W 30/19* (2012.01)
  *F16H 61/02* (2006.01)
  *F16H 63/16* (2006.01)
  *F16H 63/50* (2006.01)
  *F16H 63/46* (2006.01)
  *F16H 61/26* (2006.01)
  *F16H 59/02* (2006.01)

(52) U.S. Cl.
  CPC ...... *B60W 30/18027* (2013.01); *B60W 30/19* (2013.01); *F16H 61/0248* (2013.01); *F16H 61/26* (2013.01); *F16H 63/16* (2013.01); *F16H 63/46* (2013.01); *F16H 63/502* (2013.01); *B60W 2300/36* (2013.01); *B60W 2510/0652* (2013.01); *B60W 2710/021* (2013.01); *B60W 2710/0661* (2013.01); *B60Y 2200/12* (2013.01); *F16H 2059/0234* (2013.01); *F16H 2061/323* (2013.01)

(56) References Cited

U.S. PATENT DOCUMENTS

| | | | |
|---|---|---|---|
| 8,437,929 B2* | 5/2013 | Suzuki | B60W 10/02 701/51 |
| 8,855,873 B2* | 10/2014 | Sakamoto | G06F 17/00 701/51 |
| 9,890,849 B1* | 2/2018 | Hall | F16H 59/044 |
| 2010/0030436 A1 | 2/2010 | Suzuki et al. | |
| 2020/0040986 A1* | 2/2020 | Terai | B60W 30/19 |
| 2020/0040989 A1* | 2/2020 | Terai | F16H 61/0204 |

* cited by examiner

10,711,886 B2

VEHICLE EQUIPPED WITH TRANSMISSION

CROSS-REFERENCE TO THE RELATED APPLICATION

This application claims priority to and the benefit of Japanese Patent Application No. 2018-066962 filed on Mar. 30, 2018, the entire disclosure of which is incorporated herein by reference.

BACKGROUND OF THE INVENTION

Field of the Invention

The present invention relates to a vehicle including a manual shift driving force transmission mechanism and an automatic shift driving force transmission mechanism.

Description of the Related Art

Japanese Laid-Open Patent Application Publication No. 2012-237347 discloses a transmission system including an automatic shift mode. In the automatic shift mode, in a case where a vehicle speed or the like meets a predetermined condition, a shift control motor is driven, and a transmission operates. In a manual shift mode, in a case where a shift select switch is operated by a rider, the shift control motor is driven, and the transmission operates.

However, in the disclosure of Japanese Laid-Open Patent Application Publication No. 2012-237347, in the manual shift mode, a shift driving force for allowing the transmission to perform a shift operation is not an operation force generated by the rider's operation, but is a driving force generated by the shift control motor. The rider does not receive a reaction force from the transmission during the shift operation in the manual shift mode. Therefore, the rider cannot obtain feeling about the operation of the transmission which is mechanically performed by the rider. As a result, the rider cannot enjoy driving much.

In a case where a shift operation member (e.g., shift operation lever) operated (manipulated) by the rider is mechanically connected to the transmission, this shift operation member is also mechanically connected to the shift control motor. In this configuration, when the rider operates (manipulates) the shift operation member, a mechanical resistance is generated by the motor. As a result, the rider cannot perform smooth shift operation.

SUMMARY OF THE INVENTION

In view of the above-described circumstances, an object of the present invention is to improve the rider's operation feeling in manual shift, in a vehicle including a function of manual shift and a function of automatic shift.

According to an aspect of the present invention, a vehicle equipped with (including) a transmission, comprises a transmission which changes rotational driving power of a traveling driving power source; a shift operation member configured to be operated by a rider; a manual shift driving force transmission mechanism which transmits an operation force generated by the rider's operation of the shift operation member, to the transmission, as a shift driving force for a shift operation of the transmission; a transmission actuator which generates a driving force; an automatic shift driving force transmission mechanism which transmits the driving force generated by the transmission actuator to the manual shift driving force transmission mechanism, as the shift driving force, and the automatic shift driving force transmission mechanism includes a one-direction transmission section which prevents transmission of an operation of the manual shift driving force transmission mechanism to the transmission actuator, the operation of the manual shift driving force transmission mechanism being caused by the rider's operation of the shift operation member, the one-direction transmission section being configured to transmit the driving force generated by the transmission actuator to the manual shift driving force transmission mechanism.

In accordance with this configuration, since the operation force generated by the rider's operation of the shift operation member is transmitted as the shift driving force for the shift operation, to the transmission via the manual shift driving force transmission mechanism, the rider can receive a reaction force from the transmission. The one-direction transmission section of the automatic shift driving force transmission mechanism can prevent transmission to the transmission actuator, of the operation of the manual shift driving force transmission mechanism which is caused by the rider's operation of the shift operation member. This makes it possible to prevent generation of a mechanical resistance caused by the transmission actuator, in a case where the shift operation member is operated. Therefore, it becomes possible to improve feeling of the operation performed by the rider in the manual shift, in the vehicle including a function of manual shift and a function of automatic shift.

The automatic shift driving force transmission mechanism may include: an engaged member which is operative in response to an operation of the transmission actuator and is provided with an engaged part, and an engagement member which is operative in response to the operation of the manual shift driving force transmission mechanism and is provided with an engagement part which is engageable with the engaged part, and wherein the one-direction transmission section may include an allowance part formed between the engaged part and the engagement part, in an operation direction of the engagement member which is operative in response to the operation of the manual shift driving force transmission mechanism.

In accordance with this configuration, it becomes possible to realize a configuration in which the transmission of the operation of the manual shift driving force transmission mechanism to the transmission actuator can be prevented in a case where the shift operation member is operated, and the driving force of the transmission actuator can be transmitted to the manual shift driving force transmission mechanism.

The one-direction transmission section may further include a buffering member disposed in the allowance part.

In accordance with this configuration, even in a case where the transmission actuator causes the engaged member to quickly move, and thus the engagement part and the engaged part quickly approach each other to eliminate the allowance part, the buffering member can mitigate an impact generated between the engagement part and the engaged part. This makes it possible to suppress generation of an impact in the transmission actuator, in the automatic shift. As a result, the life of the transmission actuator can be extended.

The buffering member may have a non-linear spring constant which increases as a degree of displacement of the buffering member increases.

In accordance with this configuration, the operation resistance caused by the buffering member can be suppressed at the initial stage of the shift operation of the transmission which is performed by the driving force generated by the transmission actuator. Thus, the automatic shift can be quickly performed while mitigating an impact generated between the engagement part and the engaged part.

The buffering member may be disposed with a gap with respect to the engagement part in a state in which the shift operation member is at an unoperated position and the transmission actuator is not operating.

In accordance with this configuration, the operation resistance caused by the buffering member is not generated at the initial stage of the shift operation of the transmission which is performed by the driving force generated by the transmission actuator. In this way, the automatic shift can be quickly performed while mitigating an impact generated between the engagement part and the engaged part.

The allowance part may be provided in a region including an entire movement range of the engagement part which is movable in response to the operation of the manual shift driving force transmission mechanism.

In accordance with this configuration, it becomes possible to suitably prevent transmission to the transmission actuator, of the operation of the manual shift driving force transmission mechanism which is caused by the rider's operation of the shift operation member to the transmission actuator, without a particular control.

The vehicle may further comprise: a shift operation detector which detects the shift operation of the transmission which is performed by the rider's operation of the shift operation member; and a control unit which controls the transmission actuator in response to a detection signal of the shift operation detector, the allowance part may be formed in a region of the one-direction transmission section, the region partially including a movement range of the engagement part which is movable in response to the operation of the manual shift driving force transmission mechanism so that the region includes a center point of the movement range, and the control unit may drive the transmission actuator so that the engaged member operates in a movement direction of the engagement part, in a case where the shift operation detector detects beginning of an operation of the shift operation member.

In accordance with this configuration, since an allowance dimension of the allowance parts is small, an impact generated between the engagement part and the engaged part during the shift operation of the transmission which is performed by the driving force generated by the transmission actuator, can be reduced. Since the allowance part is formed to include the center point of the movement range of the engagement part, it becomes possible to prevent a situation in which the driving force is transmitted from the manual shift driving force transmission mechanism to the transmission actuator at the initial stage of the shift operation of the transmission which is performed by the rider's operation of the shift operation member. When the engagement part is about to contact the engaged part because of the small allowance dimension of the allowance part, the transmission actuator drives the engaged member so that the contact between the engaged part and the engagement part can be avoided. This makes it possible to prevent a situation in which the mechanical resistance is generated by the transmission actuator during the operation of the shift operation member.

The vehicle may further comprise: a shift operation detector which detects the shift operation of the transmission which is performed by the rider's operation of the shift operation member and the shift operation of the transmission which is performed by the driving force generated by the transmission actuator, the transmission may be a dog clutch transmission, in a case where the traveling driving power source is being accelerated and the shift operation detector detects beginning of the shift operation, the control unit may compensate a command value given to the traveling driving power source so that the traveling driving power source is decelerated, and in a case where the traveling driving power source is being decelerated and the shift operation detector detects beginning of the shift operation, the control unit may compensate the command value given to the traveling driving power source so that the traveling driving power source is accelerated.

In accordance with this configuration, the dog clutch can be operated without cutting off (disconnecting) the driving power transmission between the traveling driving power source and the transmission. The rider can perform the shift operation easily and quickly, without operating the main clutch.

The vehicle may further comprise: a main clutch disposed between the traveling driving power source and the transmission; and a clutch actuator which operates the main clutch.

In accordance with this configuration, the driving power transmission state of the main clutch can be switched by the clutch actuator without depending on the rider's operation. This makes it possible to improve convenience of the switching of the driving power transmission state while keeping high accuracy and responsivity of the shift operation in response to the rider's demand.

The control unit may drive the clutch actuator so that the main clutch is disengaged while the transmission is shifted from a neutral state to a driving power transmission state, and then the control unit may drive the clutch actuator so that the main clutch is gradually engaged while the vehicle is starting.

In accordance with this configuration, the main clutch is partially (half) engaged and the vehicle can start smoothly without a need for the rider to manually operate the main clutch during the starting. This makes it possible to perform easy and quick starting operation.

The above and further objects, features and advantages of the present invention will more fully be apparent from the following detailed description of preferred embodiment with reference to the accompanying drawings.

DETAILED DESCRIPTION OF THE PREFERRED EMBODIMENTS

Hereinafter, the embodiment of the present invention will be described with reference to the drawings. Throughout the drawings, the same or corresponding constituents are designated by the same reference symbols, and will not be described in detail. The stated directions are from the perspective of a rider straddling a motorcycle.

Embodiment 1

Figure 1:
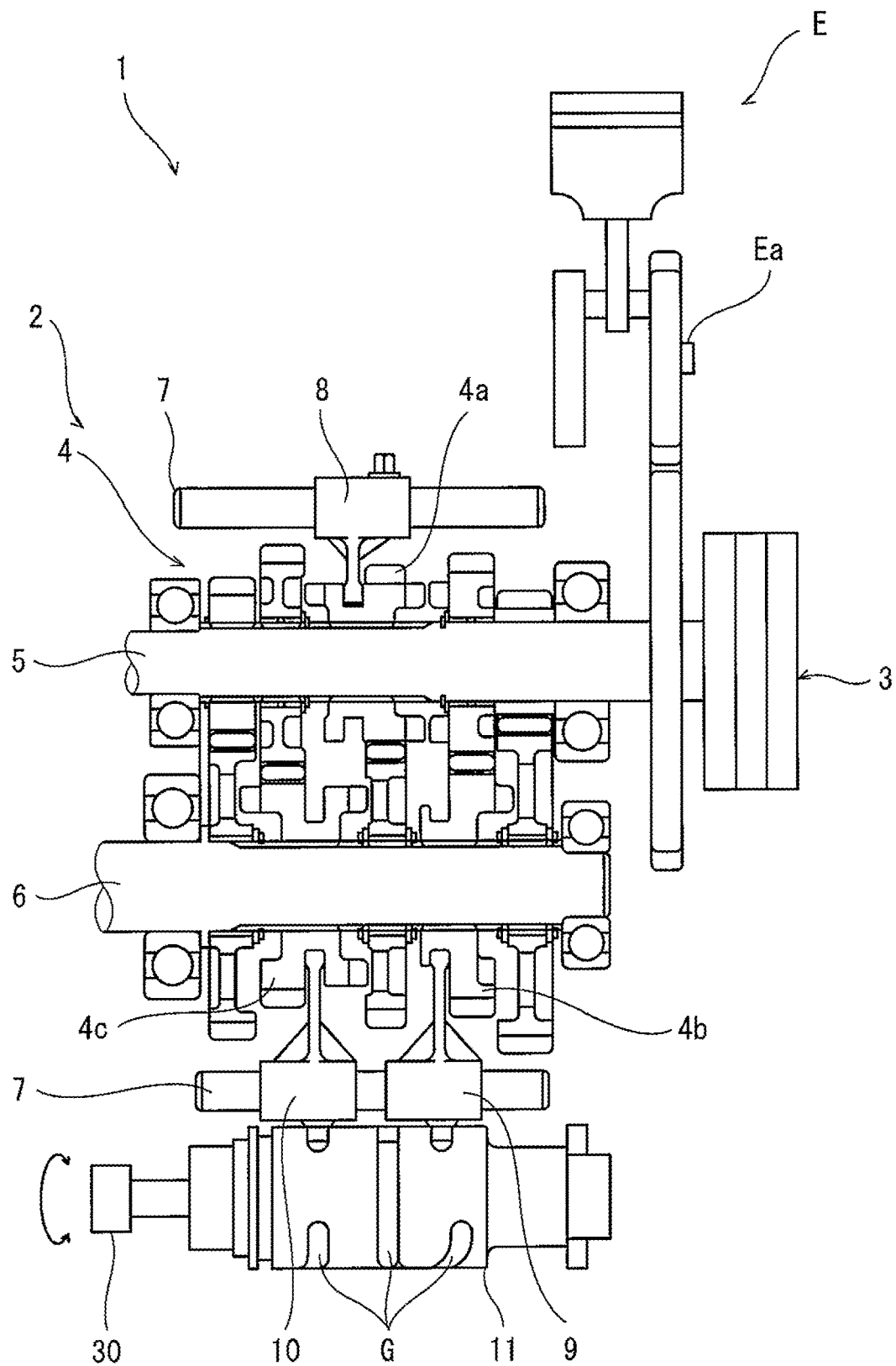
FIG. 1 is a schematic view of a vehicle equipped with a transmission according to Embodiment 1.

FIG. 1 is a schematic view of a vehicle 1 equipped with a transmission according to Embodiment 1. Referring to FIG. 1, the vehicle 1 includes an engine E (traveling driving power source) which is an internal combustion engine, a transmission 2 which changes rotational driving power generated in the engine E, and a main clutch 3 (e.g., multi-disc clutch) disposed between the engine E and the transmission 2. The transmission 2 is configured to transmit the driving power from an input shaft 5 to an output shaft 6 via selected any one of plural sets of gear trains 4 with different reduction gear ratios. The transmission 2 is, for example, a dog clutch transmission.

The rotational driving power is transmitted from a crankshaft Ea of the engine E (see FIG. 1) to the input shaft 5 of the transmission 2. A driving power output mechanism, such as a chain sprocket mechanism, is connected to the output shaft 6 of the transmission 2 to transmit the driving power to a drive wheel (not shown). In the transmission 2, shift forks 8 to 10 are sidably supported by a support shaft 7 placed in parallel with the input shaft 5 and the output shaft 6. The first end portion of the shift fork 8 is connected to a dog gear 4a of the input shaft 5. The first end portions of the shift forks 9, 10 are connected to dog gears 4b, 4c, respectively, of the output shaft 6.

The second end portions of the shift forks 8 to 10 are fitted into guide grooves G of a shift drum 11. When a driving force is transmitted to the first end portion of the shift drum 11 and the shift drum 11 is rotated, the shift forks 8 to 10 are guided to the corresponding guide grooves respectively, and slide the corresponding dog gears 4a to 4c, respectively, along the output shaft 6. In this state, one set of gear train 4 corresponding to a reduction gear ratio desired by the rider is placed in a driving power transmission state. In this way, a driving power transmission path at a desired transmission gear position is selected.

Figure 2:
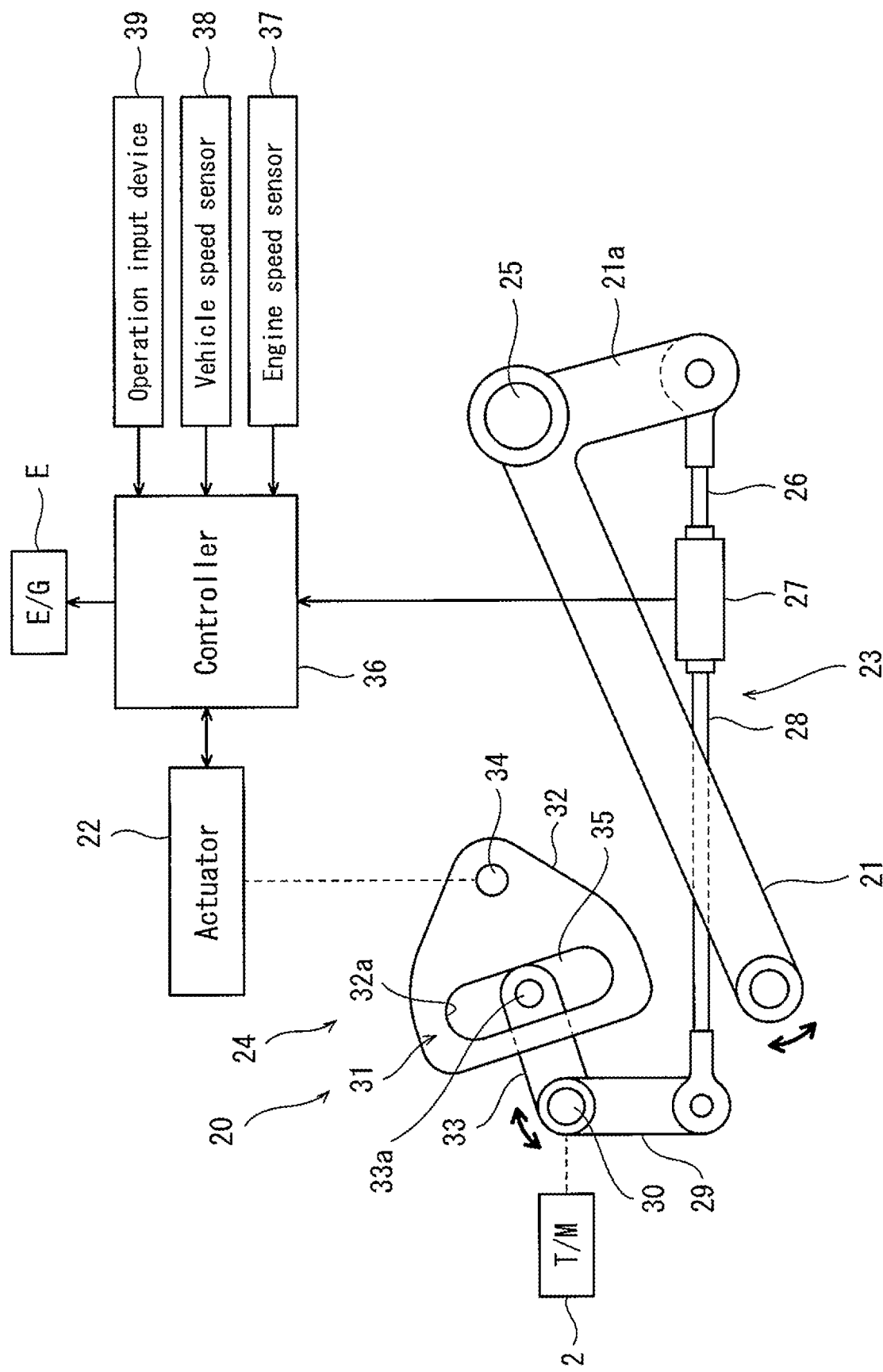
FIG. 2 is a schematic view of an operation system of a transmission system of the vehicle of FIG. 1.

FIG. 2 is a schematic view of an operation system of a transmission system 20 of the vehicle 1 of FIG. 1. Referring to FIG. 2, in the transmission system 20, the transmission 2 is rotatable by an operation force generated by the rider's operation of a shift operation lever 21 (shift operation member), as a driving force for a shift operation of the transmission 2, and is rotatable by a driving force generated by a transmission actuator 22 (e.g., electric motor), as the driving force for the shift operation of the transmission 2. In brief, the operation force generated by the rider's operation of the shift operation lever 21 rotates the shift drum 11 (see FIG. 1) and the driving force generated by the transmission actuator 22 rotates the shift drum 11.

The transmission system 20 includes a manual shift driving force transmission mechanism 23 which transmits the operation force generated by the rider's operation of the shift operation lever 21 to the shift drum 11 (see FIG. 1) of the transmission 2, and an automatic shift driving force transmission mechanism 24 which transmits the driving force generated by the transmission actuator 22 to the manual shift driving force transmission mechanism 23. The manual shift driving force transmission mechanism 23 mechanically connects the shift operation lever 21 to the first end portion of the shift drum 11. The shift operation lever 21 is operated by the rider (e.g., the rider's foot) so that the shift operation lever 21 is pivotable around a pivot shaft 25. The manual shift driving force transmission mechanism 23 includes a first rod 26, a load sensor 27 (shift operation detector), a second rod 28, a pivot arm 29, and a rotary member 30.

The first end portion of the first rod 26 is connected to a pivot part 21a integrated with the shift operation lever 21. In response to the operation of the shift operation lever 21 performed by the rider, the pivot part 21a is pivoted around the pivot shaft 25. The second rod 28 and the first rod 26 are placed on the same straight line. The second end portion of the first rod 26 and the first end portion of the second rod 28 are connected to each other via the load sensor 27. The second end portion of the second rod 28 is coupled to the first end portion of the pivot arm 29. The second end portion of the pivot arm 29 is secured to the rotary member 30. The rotary member 30 is mounted on the first end portion of the shift drum 11 (see FIG. 1) so that the rotary member 30 is rotatable together with the shift drum 11.

When the shift operation lever 21 is operated by the rider in one direction, this operation force is transmitted to the rotary member 30 via the first rod 26, the load sensor 27, the second rod 28 and the pivot arm 29. The rotary member 30 is rotated in one direction, and the shift drum 11 is rotated to perform upshifting. On the other hand, when the shift operation lever 21 is operated by the rider in an opposite direction, the rotary member 30 is rotated in an opposite direction, and the shift drum 11 is rotated to perform downshifting.

The automatic shift driving force transmission mechanism 24 includes a one-direction transmission section 31 disposed between the transmission actuator 22 and the rotary member 30. The one-direction transmission section 31 is able to transmit the rotational driving force of the transmission actuator 22 to the rotary member 30. The one-direction transmission section 31 is configured to prevent transmission of the operation of the manual shift driving force transmission mechanism 23 to the transmission actuator 22, the operation of the manual shift driving force transmission mechanism 23 being caused by the rider's operation of the shift operation lever 21.

Specifically, the one-direction transmission section 31 includes an engaged member 32 and an engagement member 33. The engaged member 32 includes an engaged part 32a and is operative in response to the operation of the transmission actuator 22. For example, the engaged member 32 is a plate-shaped member which is rotated by a rotary shaft 34 actuated by the transmission actuator 22. The engaged part 32a is an elongated engaged hole formed in the engaged member 32. The engagement member 33 includes an engagement part 33a which is engageable with the engaged part 32a, and is operative in response to the operation of the manual shift driving force transmission mechanism 23 (to be precise, the rotary member 30). For example, the engagement member 33 is an arm-shaped member protruding from the rotary member 30. The engagement part 33a is an engagement pin to be insertable from the tip end portion of the engagement member 33 into the engaged hole of the engaged part 32*a*.

The one-direction transmission section 31 includes an allowance part 35 formed between the engaged part 32*a* and the engagement part 33*a* in an operation direction of the engagement member 33 which is operative in response to the operation of the manual shift driving force transmission mechanism 23. The allowance part 35 is formed in a region including the entire movement range of the engagement part 33*a* which is operative in response to the operation of the manual shift driving force transmission mechanism 23. In this configuration, in a case where the gear of the transmission 2 is manually shifted by the rider's operation of the shift operation lever 21, the engagement part 33*a* is displaced within the allowance part 35 and does not contact the engaged member 32, even when the engagement member 33 is rotated according to the rotation of the rotary member 30. Specifically, the driving force transmitted from the manual shift driving force transmission mechanism 23 is cut off in the allowance part 35, and this driving force is not transmitted to the transmission actuator 22 via the engaged member 32. This makes it possible to prevent a situation in which a mechanical resistance caused by the transmission actuator 22 is transmitted to the rider when the shift operation lever 21 is operated by the rider.

In a case where the gear of the transmission 2 is automatically shifted by the driving force generated by the transmission actuator 22, the engaged member 32 is pivoted until the engaged part 32*a* contacts the engagement part 33*a* by the rotation of the rotary shaft 44 caused by the transmission actuator 22. Following this, the engaged member 32 is further pivoted by the transmission actuator 22, and thus the engagement part 33*a* is pushed by the engaged part 32*a*. With this operation, the rotary member 30 is rotated and the shift drum 11 is rotated. In this way, automatic shift is performed. In this case, the transmission actuator 22 may be controlled so that the rotational speed of the rotary shaft 34 is decreased immediately before the engaged part 32*a* contacts the engagement part 33*a*. When the shift operation of the transmission 2 which is performed by the driving force generated by the transmission actuator 22 is completed, the transmission actuator 22 is controlled so that so that the engagement part 33*a* returns to the center of the hole of the engaged member 32 in the operation direction of the engagement part 33*a*.

The transmission system 20 includes a controller 36 (control unit), an engine speed sensor 37, a vehicle speed sensor 38, and an operation input device 39. The controller 36 includes a processor, a volatile memory, a non-volatile memory, an I/O interface, or the like. The controller 36 is implemented in such a way that the processor performs calculations (computations) by use of the volatile memory based on the program stored in the non-volatile memory. The controller 36 is configured to control the engine E and the transmission actuator 22. The engine speed sensor 37 is configured to detect the rotational speed of the crankshaft Ea of the engine E. The vehicle speed sensor 38 is configured to detect the traveling speed of the vehicle 1. For example, the vehicle speed sensor 38 is a sensor which detects the rotational speed of the driven wheel. The operation input device 39 is operated by, for example, the rider's hand. For example, the operation input device 39 is an input button or an input lever.

In a case where the controller 36 determines that the engine E is being accelerated (the engine speed is being increased) based on the detection signal of the engine speed sensor 37, and the load sensor 27 detects the beginning (initiation) of the shift operation of the transmission 2 which is performed by the rider's operation of the shift operation lever 21, the controller 36 compensates a command value given to the engine E so that the engine speed is decreased. For example, the ignition is temporarily stopped or the throttle opening rate is temporarily reduced. The load sensor 27 serves as a shift operation detector which detects the shift operation of the transmission 2 which is performed by the rider's operation of the shift operation lever 21. On the other hand, in a case where the controller 36 determines that the engine E is being decelerated (the engine speed is being decreased) based on the detection signal of the engine speed sensor 37, and the load sensor 27 detects the beginning of the shift operation of the transmission 2 which is performed by the rider's operation of the shift operation lever 21, the controller 36 compensates a command value given to the engine E so that the engine speed is increased. For example, the throttle opening rate is temporarily increased.

With the above-described control, when the shift operation lever 21 is operated to perform the shifting, a load in a rotational direction which is applied to the dog gear being engaged, of the dog gears 4*a* to 4*c* (see FIG. 1) of the transmission 2, is temporarily relieved. Therefore, the dog clutch can be operated without cutting off the driving power transmitted between the engine E and the transmission 2. The rider can perform the shift operation easily and quickly by merely operating the shift operation lever 21 without operating the main clutch 3.

The operation force generated by the rider's operation of the shift operation lever 21 is transmitted as the shift driving force for the shift operation, to the shift drum 11 of the transmission 2 via the manual shift driving force transmission mechanism 23. The rider can receive a reaction force from the transmission 2. Therefore, in the vehicle 1 having the function of the manual shift and the function of the automatic shift, the rider can feel that the rider is performing the operation during the manual shift. This improves the rider's operation feeling.

When at least one of a case where the shift command is input to the operation input device 39 by the rider and a case where the vehicle speed detected by the vehicle speed sensor 38 meets a predetermined condition, occurs, the controller 36 outputs a shift command to the transmission actuator 22. In a case where the controller 36 determines that the engine E is being accelerated based on the detection signal of the engine speed sensor 37, and detects that the shift command is output to the transmission actuator 22, the controller 36 compensates the command value given to the engine E so that the engine speed is decreased. For example, the ignition is temporarily stopped or the throttle opening rate is temporarily reduced. In brief, the controller 36 serves as a shift operation detector which detects the shift operation of the transmission 2 which is performed by the driving force generated by the transmission actuator 22, by detecting the command given to the transmission actuator 22.

On the other hand, in a case where the controller 36 determines that the vehicle 1 is being decelerated based on the detection signal of the engine speed sensor 37 and detects that the shift command is output to the transmission actuator 22, the controller 36 compensates the command value given to the engine E so that the engine speed is increased. For example, the throttle opening rate is temporarily increased. The vehicle 1 may be provided with only one of the vehicle speed sensor 38 and the operation input device 39.

Figure 3:
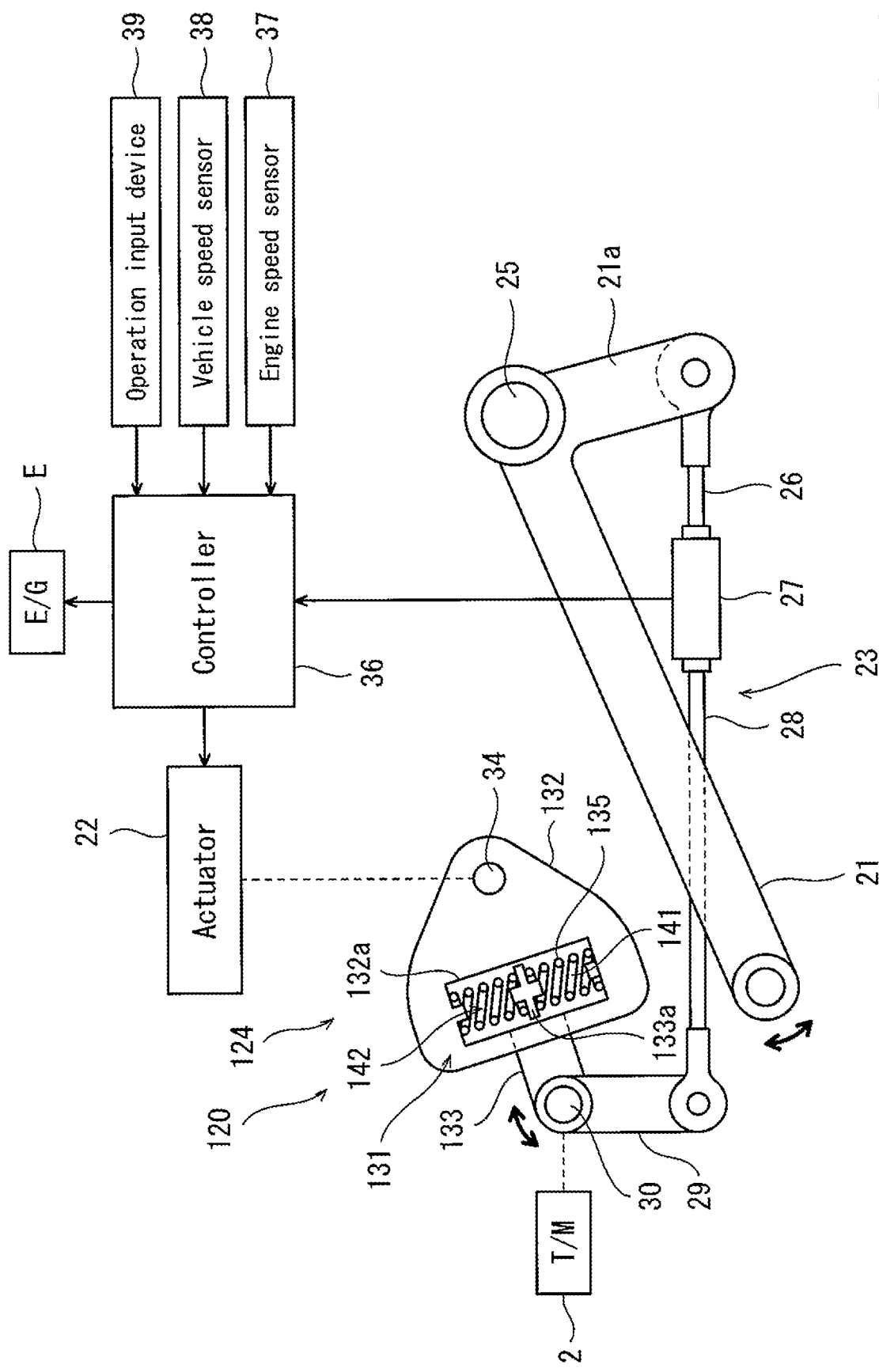
FIG. 3 is a schematic view of an operation system of a transmission system according to Modified Example 1.
Figure 4:
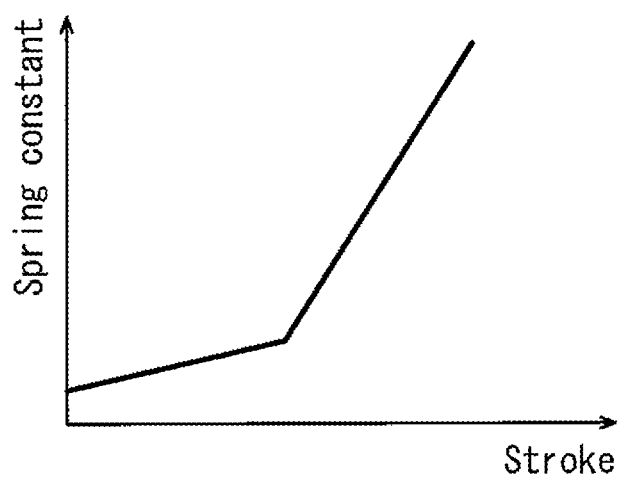
FIG. 4 is a graph showing the spring constant of buffering members (spring members) of FIG. 3.

FIG. 3 is a schematic view of the operation system of a transmission system 120 according to Modified Example 1. FIG. 4 is a graph showing the spring constant of spring members (buffering members) 141, 142 of FIG. 3. In FIG. 3, the same constituents as those of Embodiment 1 are designated by the same reference symbols and will not be described in repetition. As shown in FIG. 3, in the transmission system 120, the spring members (buffering members) 141, 142 are disposed in an allowance part 135 of a one-direction transmission section 131 of an automatic shift driving force transmission mechanism 124.

An engagement member 133 is operative in response to the operation of the manual shift driving force transmission mechanism 23 (specifically, the rotary member 30). An engagement part 133a protrudes from the tip end portion of the engagement member 133. An engaged member 132 is rotatable by the rotary shaft 34 actuated by the transmission actuator 22. An engaged part 32a, which is an engaged hole which is elongated in a displacement direction of the engagement part 133a, is formed in the engaged member 132. The engagement part 133a also serves as a spring seat supporting the inner ends of the spring members 141, 142. The engaged part 132a also serves as a spring seat supporting the outer ends of the spring members 141, 142. Specifically, the spring member 141 is disposed between a first (one) edge in a long-axis direction, of the engaged part 132a, and the engagement part 133a, while the spring member 142 is disposed between a second (the other) edge in the long-axis direction, of the engaged part 132a, and the engagement part 133a. As shown in FIG. 4, each of the spring members 141, 142 has a non-linear spring constant which increases when a degree of displacement of the spring member 141, 142, increases due to the displacement of the engagement part 133a.

In accordance with this configuration, even in a case where the transmission actuator 22 causes the engaged member 132 to quickly operate, and thus the engagement part 133a and the engaged part 132a quickly approach each other to eliminate the allowance part 135, the spring members 141, 142 can mitigate an impact generated between the engagement part 133a and the engaged part 132a. This makes it possible to suppress generation of an impact in the transmission actuator 22, in the automatic shift. As a result, the life of the transmission actuator 22 can be extended. Since each of the spring members 141, 142 has the non-linear spring constant, the operation resistance caused by the spring members 141, 142 can be suppressed at the initial stage of the shift operation of the transmission 2 which is performed by the driving force generated by the transmission actuator 22. Thus, the automatic shift can be quickly performed while mitigating an impact generated between the engagement part 133a and the engaged part 132a. The other constituents are the same as those of Embodiment 1 and will not be described in repetition.

Figure 5:
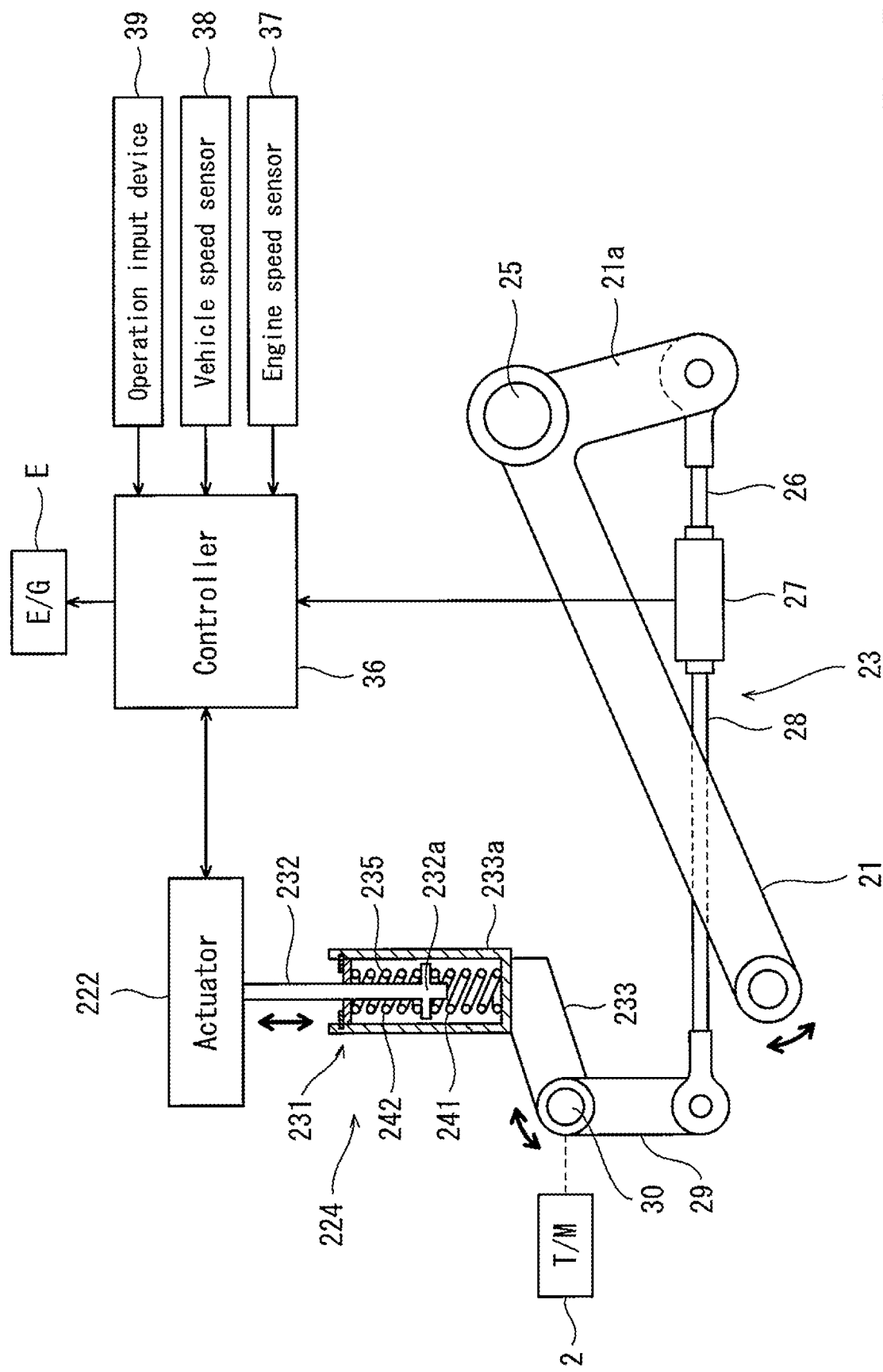
FIG. 5 is a schematic view of an operation system of a transmission system according to Modified Example 2.

FIG. 5 is a schematic view of an operation system of a transmission system 220 according to Modified Example 2. As shown in FIG. 5, in the transmission system 220, spring members (buffering members) 241, 242 are disposed in an allowance part 235 of a one-direction transmission section 231 of an automatic shift driving force transmission mechanism 224. An engagement member 233 is operative in response to the operation of the manual shift driving force transmission mechanism 23. An engagement part 233a with a cylinder shape protrudes from the tip end portion of the engagement member 233. A transmission actuator 222 is a linear motion actuator. An engaged member 232 with a rod shape is actuated by the transmission actuator 222. An engaged part 232a is formed in the engaged member 232 and is configured to be insertable into the inner space of the engagement part 133a.

More specifically, the engaged part 232a actuated by the transmission actuator 222 is configured to reciprocate like a piston, inside the engagement part 233a with the cylinder shape. In a stroke direction of the engaged part 232a, the spring member 242 is disposed between the first end of the engagement part 233a and the engaged part 232a, and the spring member 242 is disposed between the second end of the engagement part 233a and the engaged part 232a. The other constituents are the same as those of Embodiment 1 and will not be described in repetition.

Figure 6:
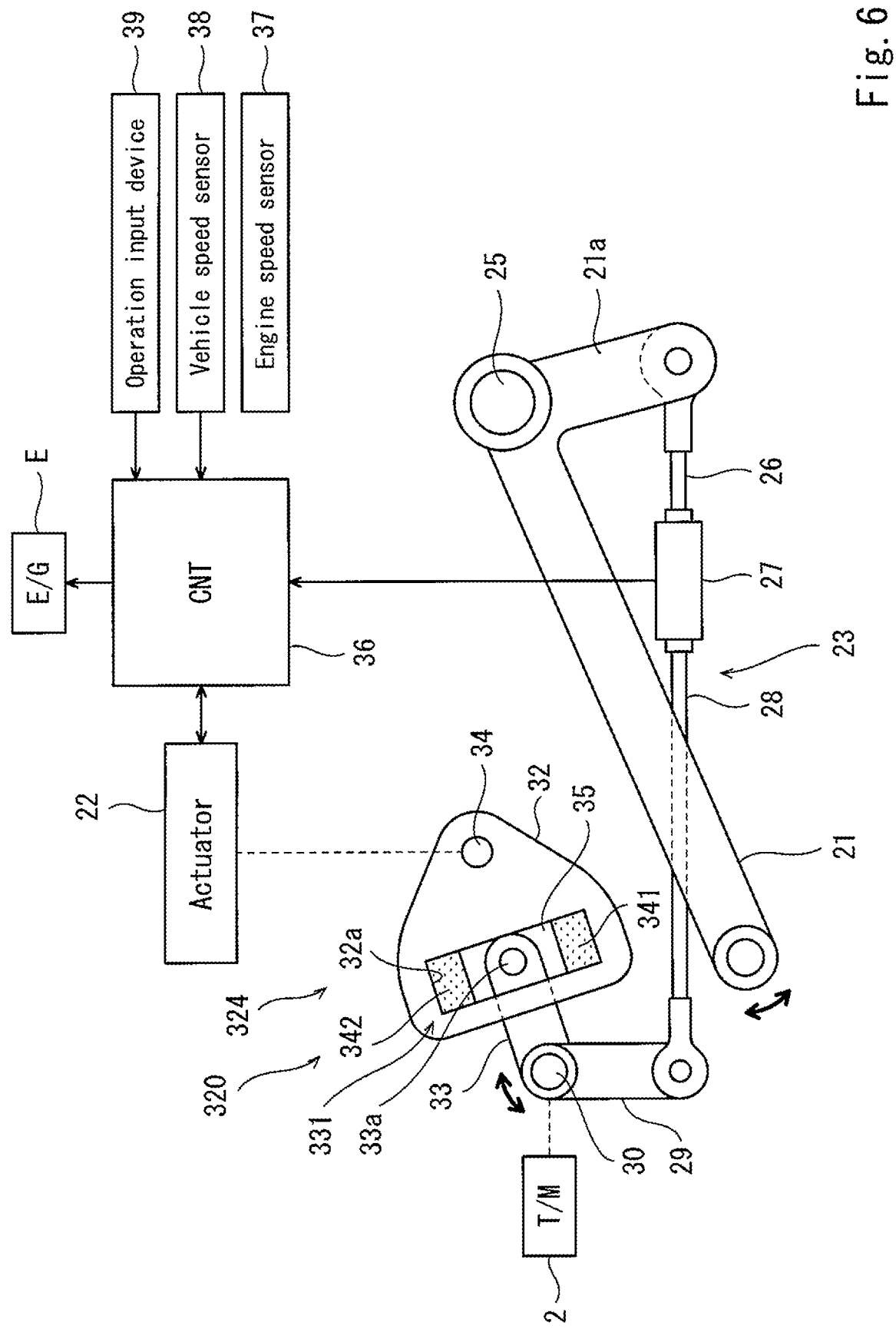
FIG. 6 is a schematic view of an operation system of a transmission system according to Modified Example 3.

FIG. 6 is a schematic view of the operation system of a transmission system 320 according to Modified Example 3. In FIG. 6, the same constituents as those of Embodiment 1 are designated by the same reference symbols and will not be described in repetition. As shown in FIG. 6, in a transmission system 320, flexible members (buffering members) 341, 342, made of, for example, a rubber, are disposed in the allowance part 35 of a one-direction transmission section 331 in an automatic shift driving force transmission mechanism 324. In this configuration, even in a case where the transmission actuator 22 causes the engaged member 32 to quickly operate and thus the engagement part 33a and the engaged part 32a quickly approach each other, the flexible members 341, 342 can mitigate an impact generated between the engagement part 33a and the engaged part 32a.

In a state in which the shift operation lever 21 is at an unoperated position (neutral position) and the transmission actuator 22 is not operating, the flexible members 341, 342 are disposed with a gap with respect to the engagement part 33a. In this configuration, the operation resistance caused by the flexible members 341, 342 does not occur, at the initial stage of the shift operation of the transmission 2 which is performed by the driving force generated by the transmission actuator 22. Thus, the automatic shift can be quickly performed while mitigating an impact generated between the engagement part 133a and the engaged part 132a. The other constituents are the same as those of Embodiment 1 and will not be described in repetition.

Figure 7:
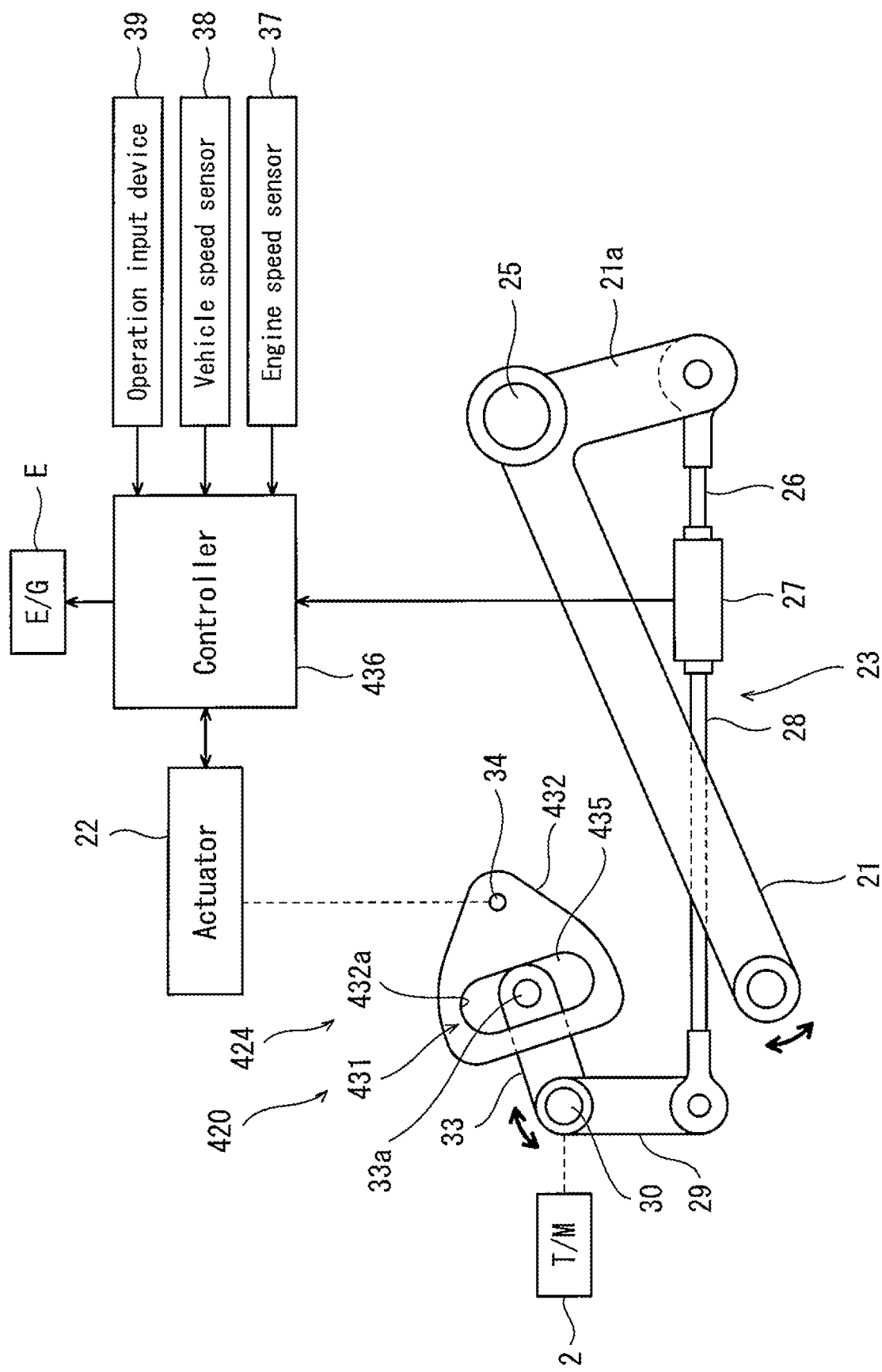
FIG. 7 is a schematic view of an operation system of a transmission system according to Modified Example 4.

FIG. 7 is a schematic view of an operation system of a transmission system 420 according to Modified Example 4. As shown in FIG. 7, in the transmission system 420, an allowance part 435 is formed in a region of a one-direction transmission section 431, the region partially including a movement range of the engagement part 33a which is operative in response to the operation of the manual shift driving force transmission mechanism 23 so that the region includes a center point of the movement range. Specifically, the allowance part 435 of FIG. 7 is smaller than the allowance part 35 of FIG. 2, and therefore a distance over which the engagement part 33a moves and contacts the edge of the engaged part 432a in the manual shift is short.

In a case where the load sensor 27 detects the beginning of the operation of the shift operation lever 21, the controller 436 drives the transmission actuator 22 so that the engagement part 33a does not contact the edge of the engaged part 432a. In other words, the controller 436 drives the transmission actuator 22 so that the engaged member 432 operates in the movement direction of the engagement part 33a, to be precise, in a direction in which the edge of the engaged part 432a is away from the engagement part 33a which approaches the edge of the engaged part 432a.

In accordance with this configuration, even in a case where an allowance dimension of the allowance part 435 is set to be small, an impact generated between the engagement part 33*a* and the engaged part 432*a* during the shift operation of the transmission 2 which is performed by the driving force generated by the transmission actuator 22 can be reduced. Since the allowance part 435 is formed to include the center point of the movement range of the engagement part 33*a*, it becomes possible to prevent a situation in which the driving force is transmitted from the manual shift driving force transmission mechanism 23 to the transmission actuator 22 at the initial stage of the shift operation of the transmission 2 which is performed by the rider's operation of the shift operation lever 21. When the engagement part 33*a* is about to contact the engaged part 432*a* because of the small allowance dimension of the allowance part 435, the transmission actuator 22 drives the engaged member 432 so that the contact between the engagement part 33*a* and the engaged part 432*a* can be avoided. This makes it possible to prevent a situation in which a mechanical resistance is generated by the transmission actuator 22 during the operation of the shift operation lever 21.

Embodiment 2

Figure 8:
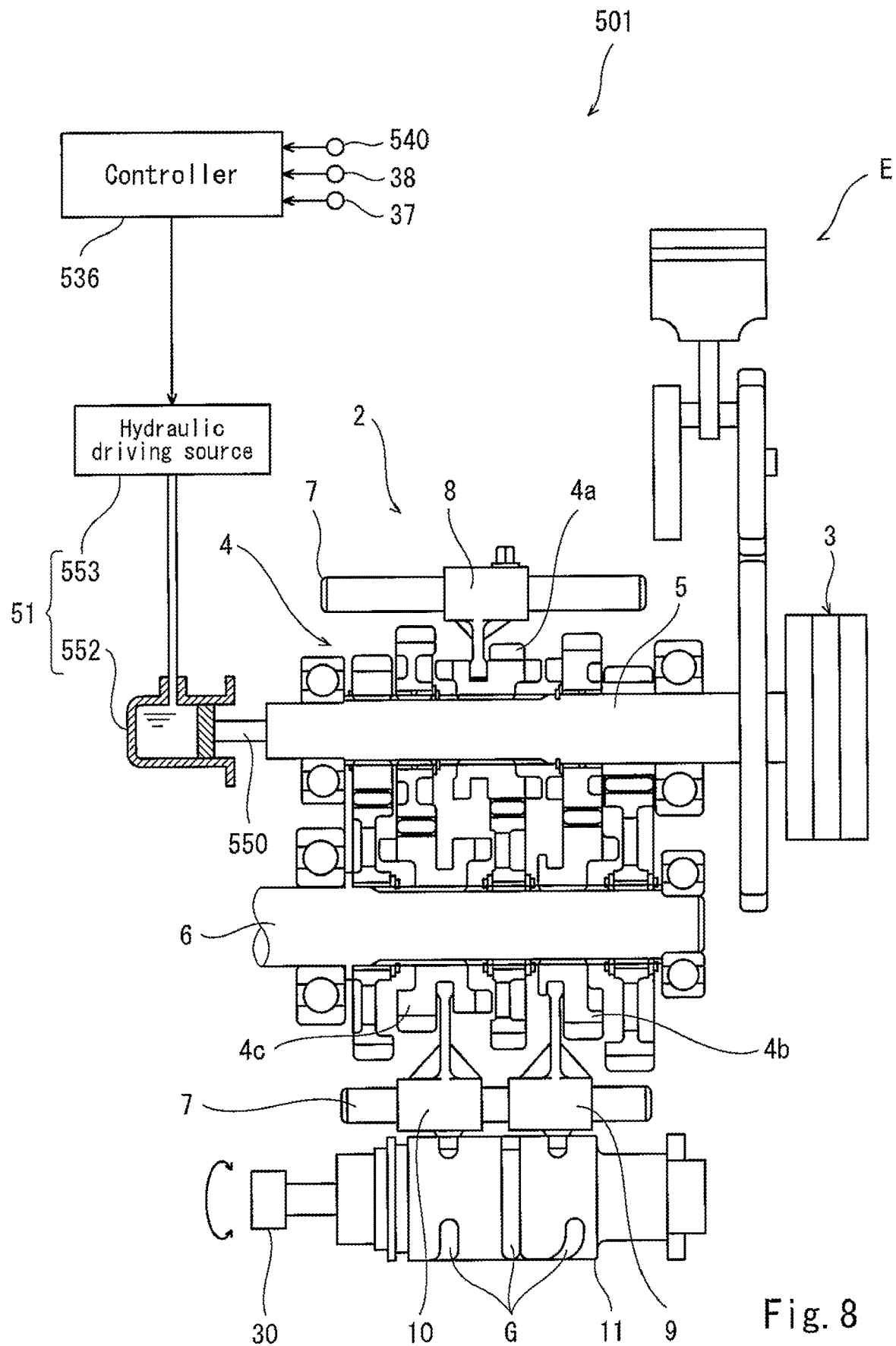
FIG. 8 is a schematic view of a vehicle equipped with a transmission according to Embodiment 2.

FIG. 8 is a schematic view of a vehicle 501 equipped with (including) a transmission according to Embodiment 2. In FIG. 8, the same constituents as those of Embodiment 1 are designated by the same reference symbols and will not be described in repetition. As shown in FIG. 8, the vehicle 501 is configured to automatically control engagement/disengagement of the main clutch 3. Specifically, a rod 550 connected to the main clutch 3 is inserted into the input shaft 5 of the transmission 2. A hydraulic piston device 552 is connected to the end portion of the rod 550, which is on a side opposite to the main clutch 3. A hydraulic driving source 553 is connected to the hydraulic piston device 552 and configured to apply a hydraulic pressure (oil pressure) to the hydraulic piston device 552. The hydraulic pressure applied to the hydraulic piston device 552 is adjusted. In this way, the rod 550 reciprocates and the main clutch 3 is engaged or disengaged.

In brief, the hydraulic piston device 552 and the hydraulic driving source 553 constitute a hydraulic actuator 551 (clutch actuator) which actuates the main clutch 3. A controller 536 is connected to the hydraulic driving source 553. The engine speed sensor 37, the vehicle speed sensor 38, a gear position sensor 540, or the like are connected to the controller 536. The above-described transmission system 20 is mounted in the vehicle 501, although not shown in FIG. 8.

In a case where the ignition of the engine E is temporarily stopped to perform the shift operation without disengaging the main clutch 3 while the engine E is accelerated, and the engine E is stopped in low-speed traveling such as starting, the rotation of the engine E may become unstable. To avoid this, during the low-speed traveling such as the starting, the main clutch 3 is automatically disengaged and the gear is changed. In this way, smooth starting can be realized without the rider's manual operation (manipulation) of the main clutch 3 while keeping the combustion of the engine E stable.

Specifically, in a case where the engine speed detected by the engine speed sensor 37 is lower than a predetermined threshold, the vehicle speed detected by the vehicle speed sensor 38 is lower than a predetermined threshold, and the gear position sensor 540 detects that the transmission 2 is going to be shifted from a neutral position to a driving power transmission state, the controller 536 drives the hydraulic actuator 551 so that the main clutch 3 becomes disengaged, and also drives the hydraulic actuator 551 so that the main clutch 3 becomes gradually engaged with an increase in the vehicle speed.

In accordance with this configuration, the main clutch 3 is partially (half) engaged and the vehicle 501 can start smoothly without a need for the rider to manually operate the main clutch 3 during the starting of the vehicle 501. This makes it possible to perform easy and quick starting operation. The main clutch 3 may be manually actuated by the rider's manual operation of a clutch lever, in addition to automatic actuation hydraulically performed. The clutch actuator is not limited to the hydraulic actuator 551 and may be another actuator (e.g., electric actuator).

Layout Example of Transmission Actuator

Figure 9:
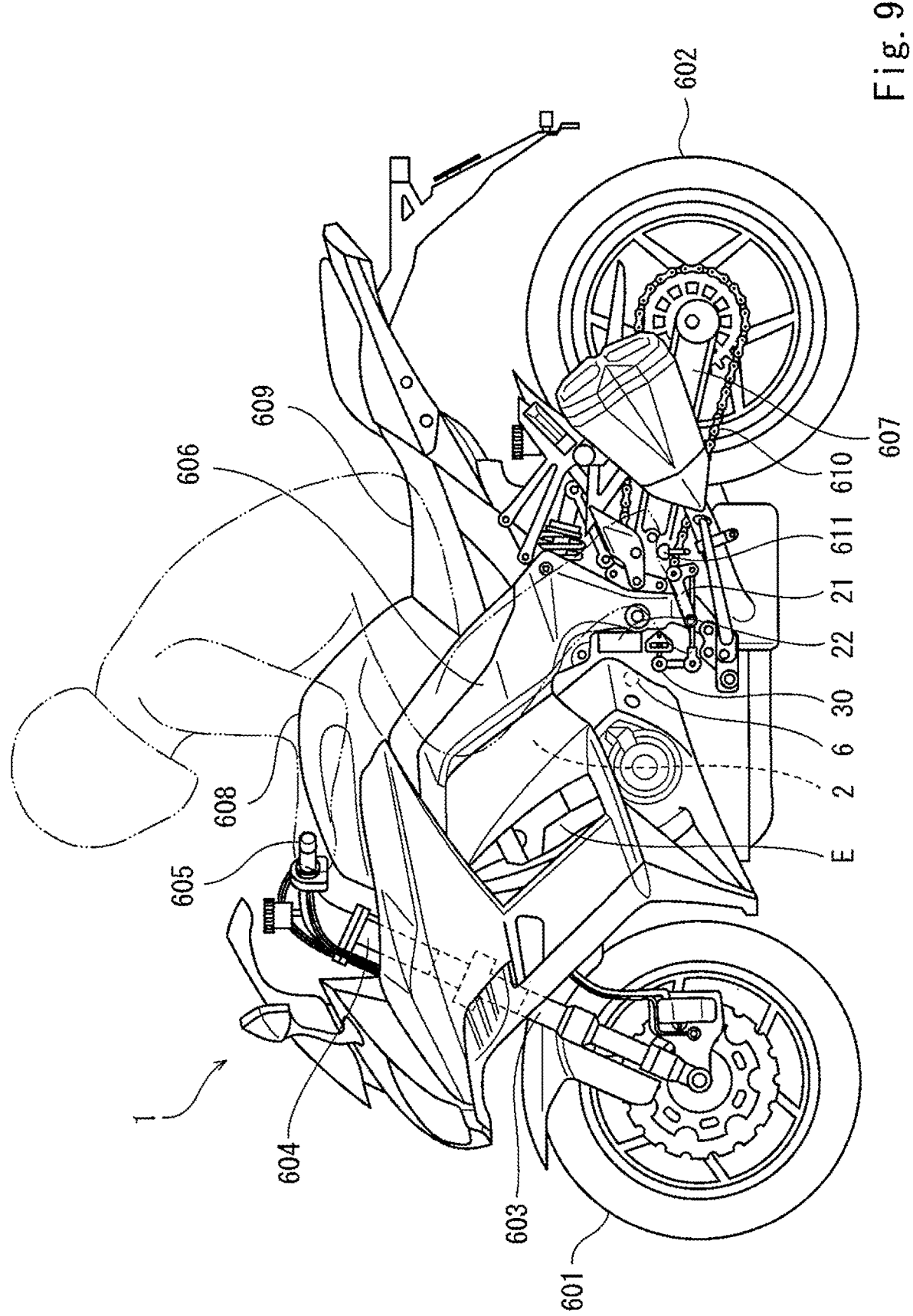
FIG. 9 is a side view showing a first layout example of a transmission actuator in a case where the vehicle is a motorcycle.
Figure 10:
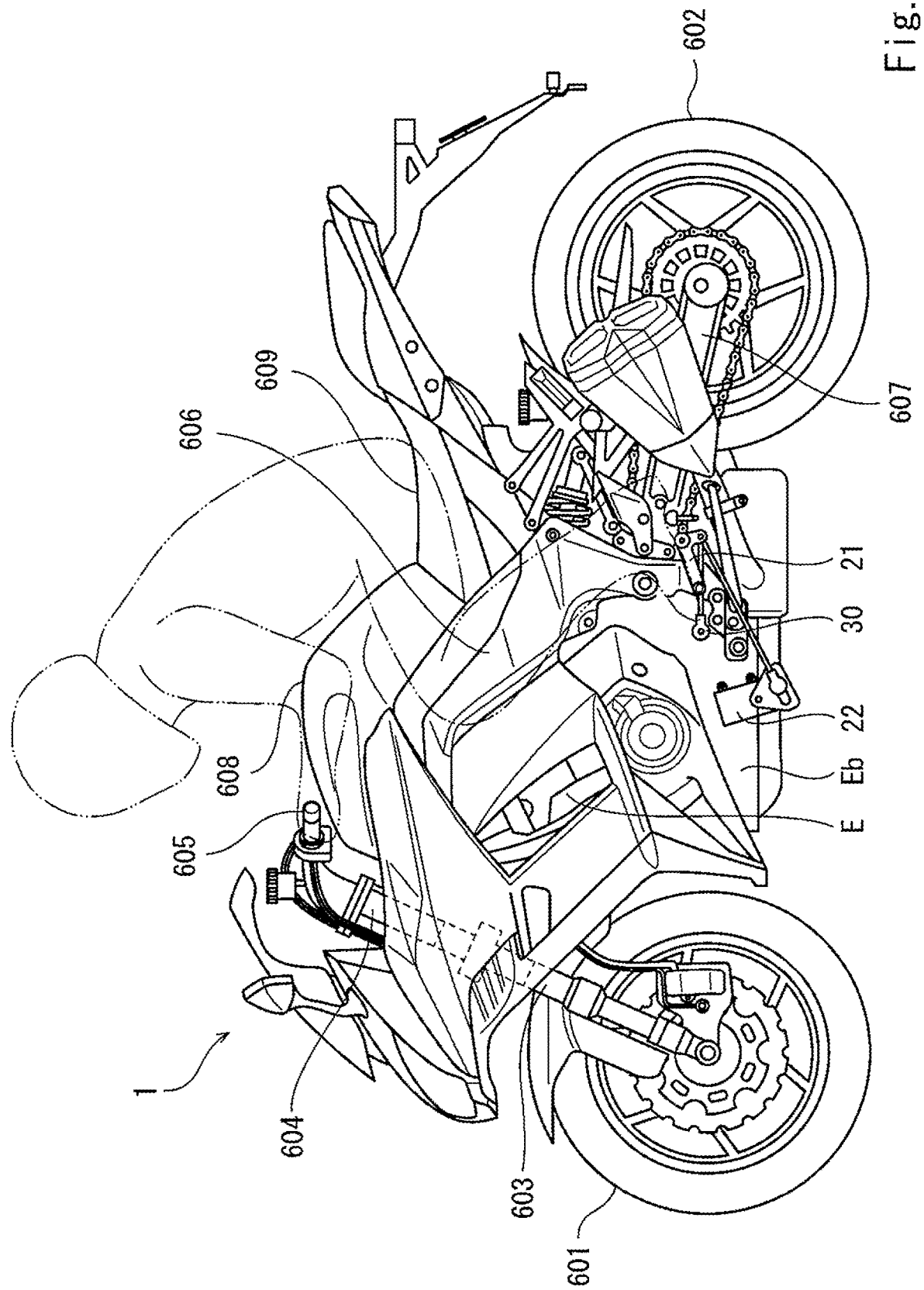
FIG. 10 is a side view showing a second layout example of a transmission actuator in a case where the vehicle is the motorcycle.

FIG. 9 is a side view showing a first layout example of the transmission actuator 22 in a case where the vehicle 1 is a motorcycle. FIG. 10 is a side view showing a second layout example of the transmission actuator 22 in a case where the vehicle 1 is the motorcycle. As shown in FIG. 9, the motorcycle 1 includes a front wheel 601 and a rear wheel 602. The front wheel 601 is connected to front forks 603. The front forks 603 are supported by a steering shaft (not shown) which is rotatably supported by a head pipe 604. A bar-shaped handle 605 which can be gripped by the rider is attached on the steering shaft and extends to the right and the left. When the rider rotates the handle 605 to steer the motorcycle 1, the front wheel 601 is steered.

A frame 606 extends rearward from the head pipe 604 while being inclined downward. The front end portion of a swing arm 607 is supported on the frame 606, and the rear wheel 602 is rotatably supported on the rear end portion of the swing arm 607. A fuel tank 608 is disposed rearward of the handle 605. A seat 609 which can be straddled by the rider is disposed rearward of the fuel tank 608. Between the front wheel 601 and the rear wheel 602, the engine E supported by the frame 606 is disposed. The transmission 2 is connected to the engine E. The driving power output from the output shaft 6 of the transmission 2 is transmitted to the rear wheel 602 via a driving power transmission loop 610 (e.g., a chain or a belt).

Steps 611 are provided on right and left sides of the seat 609. The rider's feet rest on the steps 611, respectively. In front of the step 611, the shift operation lever 21 for the manual shift is disposed. Above the manual shift driving force transmission mechanism 23 which transmits the operation force of the shift operation lever 21 to the rotary member 30 of the shift drum 11, the shift operation lever 21 for the automatic shift is disposed. Alternatively, as shown in FIG. 10, the transmission actuator 22 may be secured to a crankcase Eb of the engine E, at a location that is in front of the shift operation lever 21.

The present invention is not limited to the above-described embodiments, and the configuration can be changed, added or deleted. For example, some of the constituents in one embodiment or modified example may be applied to another embodiment or the like. Some of the constituents in one embodiment or modified example may be applied to another embodiment, and may be extracted. The above-described transmission system may be applied to a four-wheeled vehicle other than the motorcycle. As the traveling driving power source, an electric motor may be used instead of the engine E as an internal combustion engine, or the electric motor and the engine may be used. The shift operation member is not limited to the lever operated by the rider's foot, and may be operated by the rider's hand. The configurations of the engagement part and the engaged part are not limited to the above, and a male-female relation of engagement may be reversed.

What is claimed is:

1. A vehicle equipped with a transmission, the vehicle comprising:
a transmission which changes rotational driving power of a traveling driving power source;
a shift operation member configured to be operated by a rider;
a manual shift driving force transmission mechanism which transmits an operation force generated by the rider's operation of the shift operation member, to the transmission, as a shift driving force for a shift operation of the transmission;
a transmission actuator which generates a driving force; and
an automatic shift driving force transmission mechanism which transmits the driving force generated by the transmission actuator to the manual shift driving force transmission mechanism, as the shift driving force,
wherein the automatic shift driving force transmission mechanism includes a one-direction transmission section which prevents transmission of an operation of the manual shift driving force transmission mechanism to the transmission actuator, the operation of the manual shift driving force transmission mechanism being caused by the rider's operation of the shift operation member, the one-direction transmission section being configured to transmit the driving force generated by the transmission actuator to the manual shift driving force transmission mechanism.

2. The vehicle according to claim 1,
wherein the automatic shift driving force transmission mechanism includes:
an engaged member which is operative in response to an operation of the transmission actuator and is provided with an engaged part, and an engagement member which is operative in response to the operation of the manual shift driving force transmission mechanism and is provided with an engagement part which is engageable with the engaged part, and
wherein the one-direction transmission section includes an allowance part formed between the engaged part and the engagement part, in an operation direction of the engagement member which is operative in response to the operation of the manual shift driving force transmission mechanism.

3. The vehicle according to claim 2,
wherein the one-direction transmission section further includes a buffering member disposed in the allowance part.

4. The vehicle according to claim 3,
wherein the buffering member has a non-linear spring constant which increases as a degree of displacement of the buffering member increases.

5. The vehicle according to claim 3,
wherein the buffering member is disposed with a gap with respect to the engagement part in a state in which the shift operation member is at an unoperated position and the transmission actuator is not operating.

6. The vehicle according to claim 2,
wherein the allowance part is provided in a region including an entire movement range of the engagement part which is movable in response to the operation of the manual shift driving force transmission mechanism.

7. The vehicle according to claim 2, further comprising:
a shift operation detector which detects the shift operation of the transmission which is performed by the rider's operation of the shift operation member; and
a control unit which controls the transmission actuator in response to a detection signal of the shift operation detector,
wherein the allowance part is formed in a region of the one-direction transmission section, the region partially including a movement range of the engagement part which is movable in response to the operation of the manual shift driving force transmission mechanism so that the region includes a center point of the movement range, and
wherein the control unit drives the transmission actuator so that the engaged member operates in a movement direction of the engagement part, in a case where the shift operation detector detects beginning of an operation of the shift operation member.

8. The vehicle according to claim 1, further comprising:
a shift operation detector which detects the shift operation of the transmission which is performed by the rider's operation of the shift operation member, and the shift operation of the transmission which is performed by the driving force generated by the transmission actuator,
wherein the transmission is a dog clutch transmission,
wherein in a case where the traveling driving power source is being accelerated and the shift operation detector detects beginning of the shift operation, the control unit compensates a command value given to the traveling driving power source so that the traveling driving power source is decelerated, and
wherein in a case where the traveling driving power source is being decelerated and the shift operation detector detects beginning of the shift operation, the control unit compensates the command value given to the traveling driving power source so that the traveling driving power source is accelerated.

9. The vehicle according to claim 1, further comprising:
a main clutch disposed between the traveling driving power source and the transmission; and
a clutch actuator which operates the main clutch.

10. The vehicle according to claim 9,
wherein the control unit drives the clutch actuator so that the main clutch is disengaged while the transmission is shifted from a neutral state to a driving power transmission state, and then
the control unit drives the clutch actuator so that the main clutch is gradually engaged while the vehicle is starting.

* * * * *